(12) United States Patent
Kim et al.

(10) Patent No.: US 11,461,047 B2
(45) Date of Patent: Oct. 4, 2022

(54) KEY-VALUE STORAGE DEVICE AND OPERATING METHOD

(71) Applicant: SAMSUNG ELECTRONICS CO., LTD., Suwon-si (KR)

(72) Inventors: Chansoo Kim, Seoul (KR); Satish Kumar, Suwon-si (KR); Hwang Lee, Seoul (KR); Wan Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 17/011,050

(22) Filed: Sep. 3, 2020

(65) Prior Publication Data

US 2021/0181988 A1 Jun. 17, 2021

(30) Foreign Application Priority Data

Dec. 13, 2019 (KR) .................. 10-2019-0167144

(51) Int. Cl.
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/064* (2013.01); *G06F 3/0679* (2013.01); *G06F 12/0253* (2013.01); *G06F 2212/1044* (2013.01)

(58) Field of Classification Search
CPC ...... G06F 3/0659; G06F 3/0604; G06F 3/064; G06F 3/0679; G06F 12/0253; G06F 2212/1044; G06F 2212/1016; G06F 2212/7205; G06F 2212/7209; G06F 3/0638; G06F 12/0246; G06F 3/061; G06F 3/0652; G06F 3/0656
See application file for complete search history.

(56) References Cited

U.S. PATENT DOCUMENTS

| | | | |
|---|---|---|---|
| 9,298,604 B2 * | 3/2016 | Sengupta | ............ G06F 12/0866 |
| 9,311,252 B2 | 4/2016 | Fong et al. | |
| 9,785,547 B2 | 10/2017 | Takabatake | |
| 10,168,926 B2 | 1/2019 | Jung et al. | |
| 10,338,817 B2 | 7/2019 | Peterson et al. | |
| 10,719,495 B2 * | 7/2020 | Boles | .................. G06F 16/2246 |

(Continued)

OTHER PUBLICATIONS

US 9,852,063 B2, 12/2017, Kanno (withdrawn)

*Primary Examiner* — Francisco A Grullon
(74) *Attorney, Agent, or Firm* — Volentine, Whitt & Francos, PLLC

(57) ABSTRACT

A key-value storage device includes a non-volatile memory (NVM) divided into blocks, and a data buffer including a key buffer, a value buffer and a mapping buffer, and a controller including a key-value manager. The key-value manager receives a command and key-pairs including keys and values respectively corresponding to the keys, separates the keys from the values, store the keys in the key buffer and store the values in the value buffer, generates a value stream by combining a set of values stored in the key buffer, generates a key stream by combining a set of keys and merging indices for values respectively corresponding to the keys in the set of keys, and updates a key matrix stored in the mapping buffer and indicating whether an index among the indices of the key stream is related to each one of the blocks of the NVM.

13 Claims, 17 Drawing Sheets

(56) References Cited

U.S. PATENT DOCUMENTS

| | | | |
|---|---|---|---|
| 10,725,988 B2 * | 7/2020 | Boles | G06F 16/2246 |
| 2013/0282965 A1 * | 10/2013 | Sengupta | G06F 12/0866 |
| | | | 711/104 |
| 2017/0329705 A1 | 11/2017 | Gupta et al. | |
| 2018/0225315 A1 * | 8/2018 | Boles | G06F 16/2455 |
| 2018/0225316 A1 * | 8/2018 | Boles | G06F 16/2246 |
| 2018/0225321 A1 | 8/2018 | Boles et al. | |
| 2019/0171559 A1 | 6/2019 | Lee et al. | |

* cited by examiner

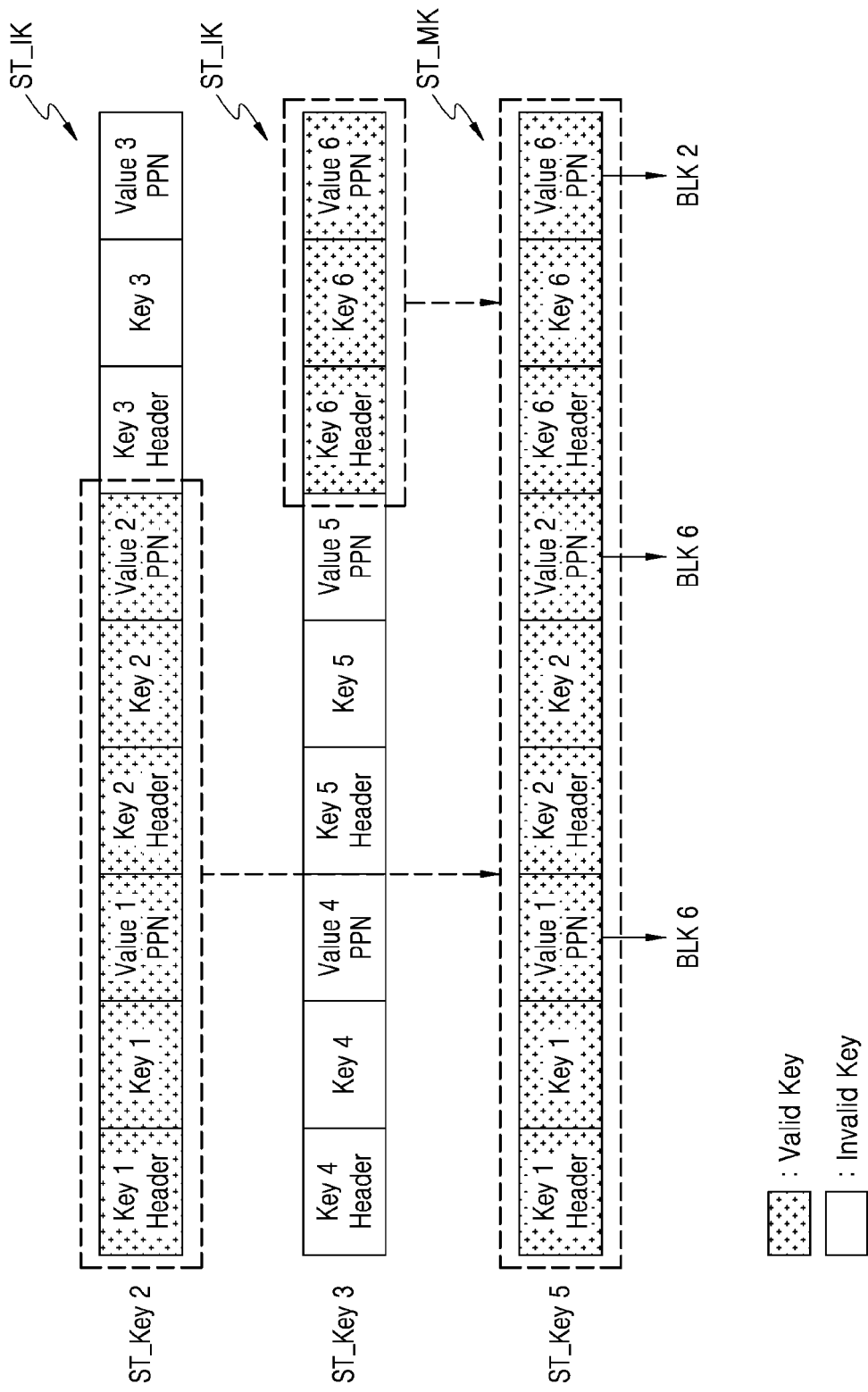

BLK NUMBER

| | 1 | 2 | 3 | 4 | 5 | 6 | 7 | 8 |
|---|---|---|---|---|---|---|---|---|
| 1 | 0 | 0 | 1 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 1 | 0 | 1 | 0 | 1 | 0 | 0 | 0 |
| 5 | 0 | 1 | 0 | 0 | 0 | 1 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |

KEY STREAM NUMBER

: updated

KEY-VALUE STORAGE DEVICE AND OPERATING METHOD

CROSS-REFERENCE TO RELATED APPLICATION

This application claims the benefit of Korean Patent Application No. 10-2019-0167144, filed on Dec. 13, 2019 in the Korean Intellectual Property Office, the subject matter of which is hereby incorporated by reference.

BACKGROUND

The inventive concept relates to storage devices and operating methods for the storage devices. More particularly, the inventive concept relates to key-value storage devices that store data based using a key-value relationship and operating methods for a key-value storage device.

Most contemporary electronic devices include memory components capable of storing and retrieving data. Such electronic devices require an operating method for storing and retrieving data. To this end, electronic devices may include a storage device or a storage system capable of storing data and retrieving data while communicating with an external host.

Many contemporary storage devices and storage systems make use of non-volatile, memory that is capable of preserving data continuity even in the absence of applied power. Storage devices may be classified as block storage, file storage, object storage, etc. A block storage manages data based on physical location, and a file storage manages data based on logical sequence. In contrast, an object storage may manage data based on unique identifier(s). The block storage and the file storage are useful when an amount of ordinary data to-be-stored in large, while the object storage is an efficient alternative when an amount of less ordinary (or atypical, or disparate) data to-be-stored is large. One example of an object storage is the key-value storage that stores data using key-value relationships.

SUMMARY

Embodiments of the inventive concept provide key-value storage devices capable of reducing the computational overhead associated with the execution of a garbage collection operation and improving overall processing speed by determining the validity of values stored in each block of a non-volatile memory device using a key stream. Embodiments of the inventive concept provides methods of operating a key-value storage device that reduce the computational overhead associated with the execution of a garbage collection operation and improve overall processing speed by determining the validity of values stored in each block of a non-volatile memory device using a key stream.

According to an aspect of the inventive concept, there is provided a key-value storage device including; a non-volatile memory (NVM) divided into blocks, a data buffer including a key buffer, a value buffer and a mapping buffer, and a controller including a key-value manager, wherein the key-value manager is configured to receive a command and key-pairs including keys and values respectively corresponding to the keys, separate the keys from the values, store the keys in the key buffer and store the values in the value buffer, generate a value stream by combining a set of values stored in the key buffer, generate a key stream by combining a set of keys and merging indices for values respectively corresponding to the keys in the set of keys, and update a key matrix stored in the mapping buffer and indicating whether an index among the indices of the key stream is related to each one of the blocks of the NVM.

According to an aspect of the inventive concept, there is provided a key-value storage device including; a non-volatile memory (NVM) divided into blocks, and configured to store key streams including keys, and to store value streams including values respectively corresponding to the keys, a data buffer configured to store a key matrix indicating for reach key stream among the key streams, whether values corresponding to keys in the key stream are stored in each one of the blocks, and a controller configured to select a target block from among the blocks based on the key matrix and perform a garbage collection on the target block.

According to an aspect of the inventive concept, there is provided an operating method for a key-value storage device including a non-volatile memory (NVM) divided into blocks. The operating method includes; generating and storing a key stream including keys and addresses for values respectively corresponding to the keys, for each key stream, updating a key matrix indicating whether an address related to each of the of blocks is included, based on the key matrix, selecting a target block from among the blocks, and performing a garbage collection operation on the target block.

BRIEF DESCRIPTION OF THE DRAWINGS

Embodiments of the inventive concept will be more clearly understood from the following detailed description taken in conjunction with the accompanying drawings in which:

FIGS. 6, 7A and 7B are conceptual diagrams further illustrating the operation of a key-value storage device according to embodiments of the inventive concept;

DETAILED DESCRIPTION

Figure 1:
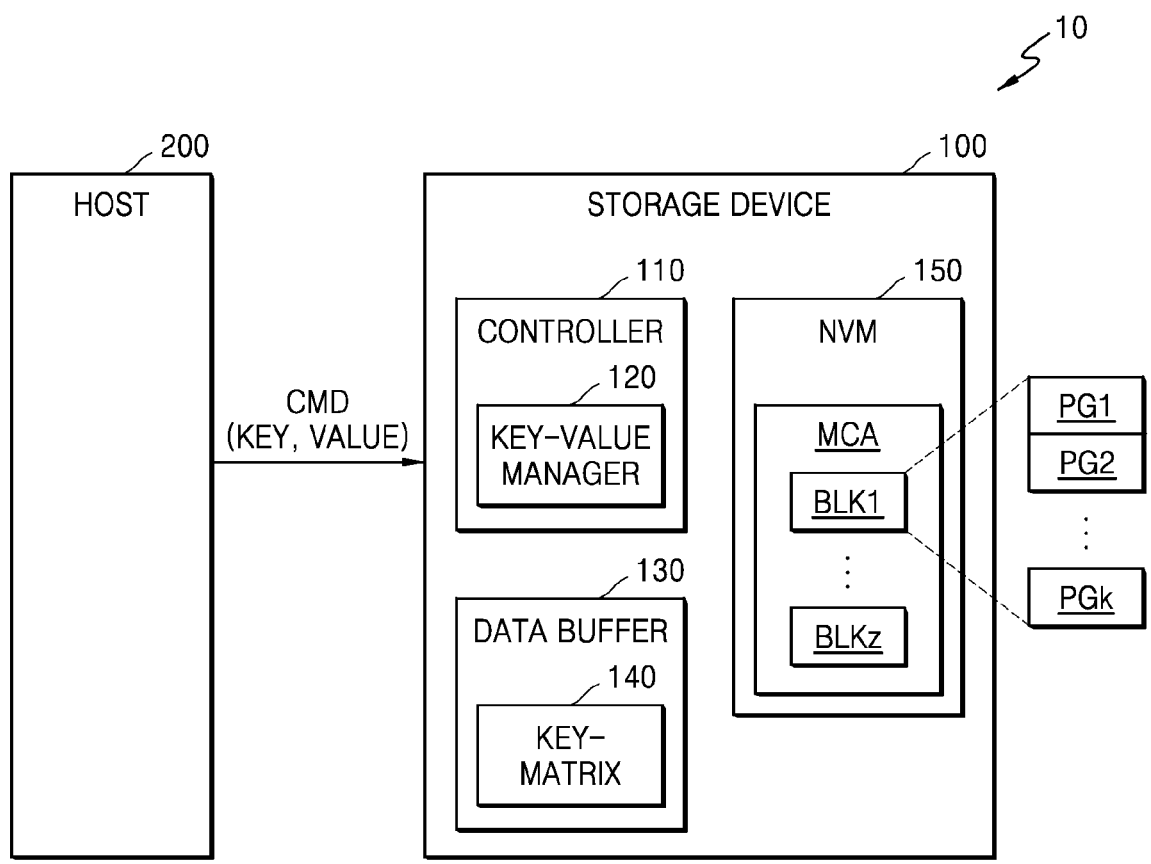
FIG. 1 is a block diagram illustrating a storage system according to embodiments of the inventive concept.

Figure (FIG. 1 is a block diagram illustrating a storage system 10 according to an embodiment.

Referring to FIG. 1, the storage system 10 may generally include a storage device 100 and a host 200. The storage device 100 may include a controller 110, a data buffer 130, and a non-volatile memory (NVM) 150. The host 200 may communicate with the storage device 100 via one or more interface(s). Here, for example, the host 200 may be implemented as an application processor (AP) or a system-on-a-chip (SoC).

The storage device 100 may include a key-value storage device or a "key-value storage" (e.g., a key-value solid state drive (SSD)). In this regard, key-value storages are devices that efficiently process data using key-value pairs. Here, a "key-value pair" may include a unique key and a value corresponding to the key. A key-value pair may be referred to as a "tuple" or a "key-value tuple". In a key-value pair, the "key" may be represented as any data string (e.g., a file name, a uniform resource identifier (URI), a hash, etc.), and the "value" may be represented as any type of data (e.g., an image, a user-preferred file, a document, etc.). The size of the key may vary and/or the size of the value may vary. For example, the size of the value may vary according to the data type of the value.

Hereinafter, embodiments in which the storage device 100 is assumed to be a key-value storage will be described. Referring to FIG. 1, for example, the storage device 100 may considered a key-value storage. However, the storage device 100 is not limited to only key-value storages, and may be applied to any object cache system or any object storage system that manages data according to object units. Accordingly, the storage device 100 of FIG. 1 may manage data according to object units using a method other than the key-value pair method.

The host 200 may communicate (e.g., generate and transmit) at least one command (CMD), at least one key (KEY) and at least one value (VALUE) to the storage device 100. The command may be a read (or get) request for retrieving data stored in the storage device 100 or, a write (or put) request for writing data (e.g., a key-value pair) to the storage device 100. As an example, the host 200 may transmit a get command including a key to the storage device 100, and the storage device 100 may read a value corresponding to the key from the NVM 150 in response to the get command.

The controller 110 may write a value to the NVM 150 in response to a write request from the host 200, or read a stored value from the NVM 150 in response to the read request from the host 200. Hence, in the illustrated example of FIG. 1, the controller 110 includes a key-value manager 120.

The key-value manager 120 may receive key-value pair(s) included in (or communicated with) a command CMD, and "separate" a plurality of keys (hereafter "keys") from a plurality of values (hereafter, "values") included in the key-value pair(s). In this regard, the key-value manager 120 may extract the keys included in key-value pair(s) and store the keys in the data buffer 130. Further, the key-value manager 120 may extract the values included in key-value pair(s) and store the values in the data buffer 130.

When a certain number of values (e.g., a certain amount of data) has been stored in the data buffer 130, the key-value manager 120 may generate a "value stream" from the stored values.

When a certain number of keys (e.g., a certain amount of data) has been stored in the data buffer 130, the key-value manager 120 may generate a "key stream" by combining the keys with "indices" corresponding to the values, that respectively correspond to the keys. Thereafter, the key-value manager 120 may store the generated value stream and/or the generated key stream in different areas of the NVM 150. In this regard, an "index" corresponding to a value may be location information identifying an area of the NVM 150 at which the value is stored.

The key-value manager 120 may also update a key-matrix 140 stored in the data buffer 130 based on the generated key stream. That is, the key-matrix 140 may include, for each key stream, information indicating whether values respectively corresponding to keys included in one key stream are stored in one or more block(s) of the NVM 150.

In other words, the key-matrix 140 may include, for each key stream, "matching information" between block(s) in which a key stream and values corresponding to the key stream are stored. For example, the key-matrix 140 provide matching information indicating, for each key stream, whether an index related to one or more blocks is included. For example, assuming that the NVM 150 includes three (3) blocks (e.g., a first block, a second block, and a third block), the key-matrix 140 may include, for each key stream, values indicating whether an index related with the first block is included, whether an index related with the second block is included, and whether an index related with the third block is included. A more detailed description of the updating function performed by the key-matrix 140 and the key-value manager 120 will be presented hereafter with reference to FIGS. 4A and 4B.

The key-value manager 120 may also perform (or control the execution of) a garbage collection operation within the storage device 100 using the key-matrix 140. In this regard, the key-value manager 120 may select a "target block" from among blocks of the NVM 150 using the key-matrix 140, and perform the garbage collection operation on the target block.

For example, the key-value manager 120 may identify a number of key streams including an index related to each block among the blocks of the NVM 150 using the key-matrix 140, and may select a block having the least number of identified key streams as the target block. In other words, the key-value manager 120 may be used to select (or target) a block that should have stored (or is expected to have stored) the least number of valid values by referencing the key-matrix 140. Thereafter, the key-value manager 120 may control, at least in part, the execution of a garbage collection operation on the target block. A description of one possible garbage collection operation will be provided in some additional detail with reference to FIGS. 8A through 8D.

The data buffer 130 may include at least one memory device configured to store keys, values, and the key-matrix 140. For example, the data buffer 130 may include a volatile memory device such as dynamic random access memory (RAM) (DRAM) and static RAM (SRAM).

The NVM 150 may include a memory cell array (MCA), wherein the memory cell array is divided into a plurality of memory blocks (hereafter, "blocks") (e.g., blocks BLK1 through BLKz in FIG. 1). In this context, the NVM 150 may be variously divided (e.g., physically divided and/or logically divided) into differentiated (e.g., addressable) blocks. each block may be further divided into (e.g.,) a plurality of pages (e.g., PG1 through PGk). Here, 'z' and are positive integer(s) and may be vary according to embodiment. For example, a block may be a unit of erase, and a page may be a unit of write and read. In some embodiments, the memory cell array may include a plurality of planes, a plurality of dies, and/or a plurality of chips. As an example, the NVM 150 may include a flash memory device (e.g., a NAND flash memory device). However, the inventive concept is not limited thereto, and the NVM 150 may include a resistive memory device such as a resistive RAM (rRAM), a phase change RAM (PRAM), a magnetic RAM (MRAM), etc.

The storage system 10 may be implemented as (e.g.,) a personal computer (PC), a data server, a network-coupled storage, an Internet of Things (IoT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, and the like.

In some embodiments, the storage device 100 may include an internal memory embedded in an electronic device. For example, the storage device 100 may include an embedded universal flash storage (UFS) memory device or an embedded multi-media card (eMMC). In some embodiments, the storage device 100 may include an external memory removable from the electronic device. For example, the storage device 100 may include a UFS memory card, a compact flash (CF) memory card, a secure digital (SD) card, a micro-SD card, a mini SD card, an extreme digital (xD) card, or a memory stick.

In contrast to key-value storages consistent with certain embodiments of the inventive concept, comparative storage devices may individually store keys and values respectively separated from key-value pairs and perform garbage collection using validity information included in the value. Accordingly, when comparative storage devices perform garbage collection on a target block, a key-value storage reads all values stored in the target block, verifies whether each value is valid by using validity information included in read values, and then stores only valid values in a new area. Because this method does not selectively read only the valid values from the target block, a relatively high computational overhead is required to perform the garbage collection operation. This slows the overall processing capabilities of the storage device.

Additionally or alternatively, the comparative storage devices may use a multi-map table to identify the validity of each value in relation to the validity information. Hence, the multi-map table is a table that—for values stored by merging in succession—includes valid bits indicating the validity of each of an address in which a first value is stored, and consecutive values. When performing garbage collection, the comparative storage devices must identify address information and order information included in the validity information associated with values read from the target block, and determine whether a corresponding value is a valid value by identifying the address verified in the multi-map table and the valid bits corresponding to an identified order. Additionally, the number of consecutively merged values defined in the multi-map table will change according to the size of the value. In other words, when the size of the value decreases, because the number of values that are continuously merged increases, the size of the multi-map table also increases. And when the size of the value increases, the number of values that are continuously merged decreases, and accordingly, the size of the multi-map table also decreases. As a result, comparative storage devices suffer from an issue that the size of information required for validity verification causes instability in a validity verification operation depending on the size of the value.

In contrast, the key-value storage devices according to embodiments of the inventive concept may generate a key stream by merging indices including matching information that identifies areas (e.g., blocks BLK1 through BLKz) in the NVM 150 at which the values for corresponding keys are stored, and may generate a key matrix including information about the index for each key stream. Thus, key-value storage devices according to embodiments of the inventive concept, when performing a garbage collection, may read the key stream including the index related with the target block undergoing garbage collection using the key matrix, and obtain addresses only for values related to the target block from the read key stream. Accordingly, key-value storage devices according to embodiments of the inventive concept may greatly reduce the computational overhead associated with the garbage collection operations, and increase overall processing speed.

In addition, key-value storage devices according to embodiments of the inventive concept may use the key matrix having a size corresponding to a number of blocks and a number of key streams. Therefore, key-value storage devices according to embodiments of the inventive concept may prevent instability of a validity verification operation depending on a change in the size of a value, as the information required for determining validity has a constant size, regardless of the size of the value.

Figure 2:
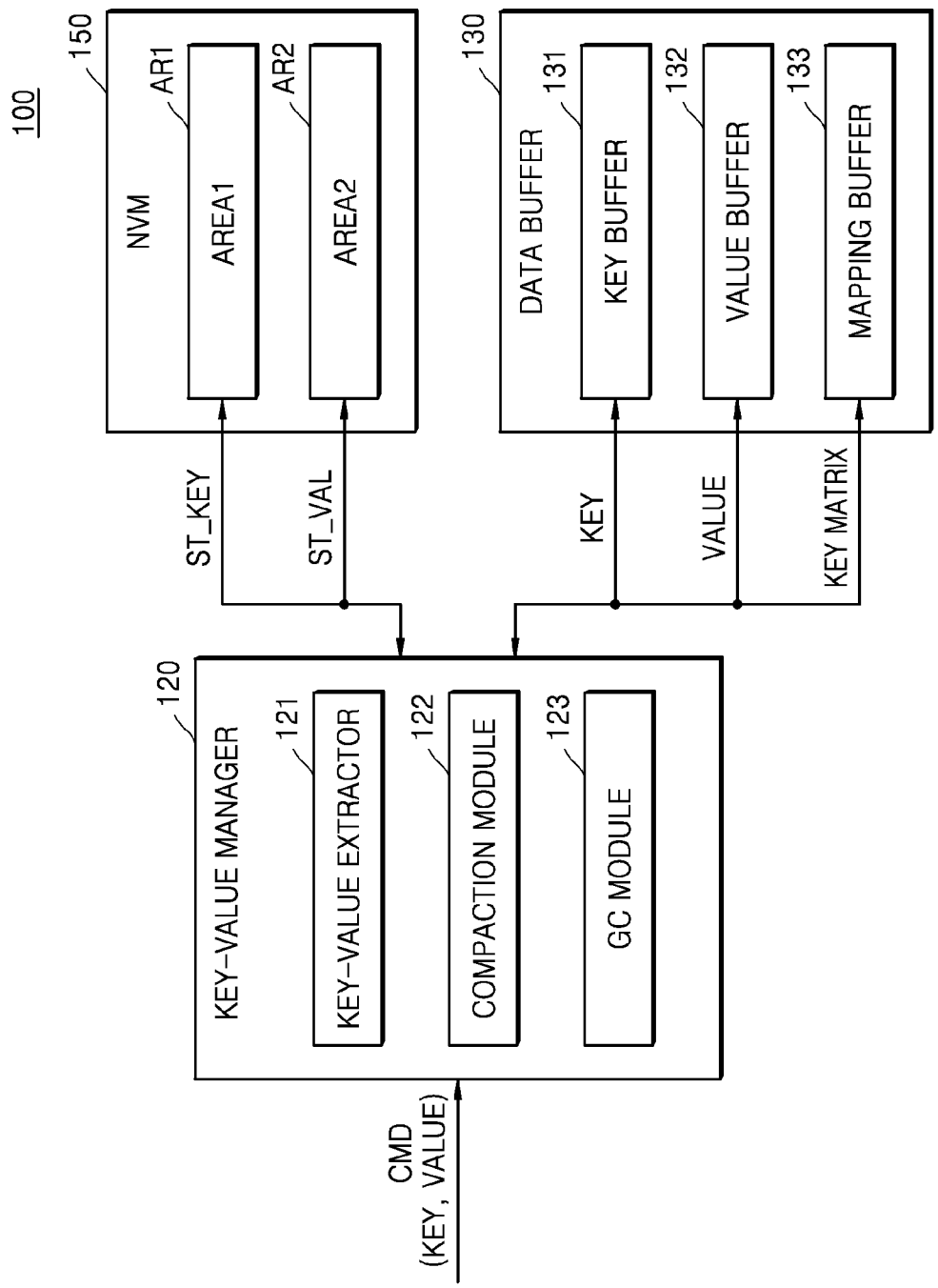
FIG. 2 is a block diagram further illustrating in one example the key-value storage device of FIG. 1.

FIG. 2 is a block diagram further illustrating in one example the storage device 100 of FIG. 1. Referring to FIGS. 1 and 2, the storage device 100 again includes the key-value manager 120, the data buffer 130, and the NVM 150.

The key-value manager 120 may include a key-value extractor 121, a compaction module 122, and a garbage collection (GC) module 123.

The key-value extractor 121 may extract the key (KEY) and the value (VALUE) included in the command (CMD) received (e.g.,) from the host 200. The key-value extractor 121 may then store the extracted key in a key buffer 131 of the data buffer 130, and store the extracted value in a value buffer 132 of the data buffer 130. In this regard, the key buffer 131 and the value buffer 132 may be configured as separate memory elements. Alternately, the key buffer 131 and the value buffer 132 may be configured as different areas of the data buffer 130.

When a number (or volume) of values (hereafter, a "set of values") stored in the value buffer 132 becomes are equal to or greater than a predetermined number of values or a predetermined volume amount of data associated with the values (hereafter, a "value set limit"), the key-value extractor 121 may generate a value stream (ST_VAL) based on the set of values. For example, the key-value extractor 121 may generate the value stream by sequentially arranging the set of values. The key-value extractor 121 may store the generated value stream in a second area AR2 of the NVM 150.

When the set of values stored in the key buffer 131 reaches or exceeds the predetermined value set limit, the key-value extractor 121 may also generate a key stream (ST_KEY) based on the a plurality of keys (hereafter, a "set of keys"). For example, the key-value extractor 121 may generate the key stream by successively arranging the set of keys, and merging indices for values that respectively correspond to the keys included in the set of keys with the set of keys. Here, an index for a value may identify an area of the NVM 150 in which the value is stored. For example, an index for a value may include a physical address at which the value is stored in the second area AR2 of the NVM 150.

In some embodiments, the key-value extractor 121 may manage physical address(es) at which the key is stored in a first area AR1 of the NVM 150 using a key table. For example, the key table may be generated as a hash table that stores a hashed key corresponding to the key as a mapping index for the key, together with the key.

The key-value extractor 121 may also update the key-matrix 140 indicating whether an index related to each one of the blocks of the NVM 150 of each key stream, based on the generated key stream, is included, and may store the updated key-matrix 140 in a mapping buffer 133. For example, when the index for a value is the physical address for an area of the NVM 150 in which the value is stored, the key-value extractor 121 may update the key-matrix 140 by identifying a block related to the physical address and included in the key stream among the blocks of the NVM 150, and by changing the key stream generated in the key-matrix 140 and a value corresponding to the identified block.

The compaction module 122 may perform a compaction operation on at least one key stream stored in the first area AR1 of the NVM 150. In this context, the compaction operation may generate a "new key stream" by deleting at least one key corresponding to an invalid value stored in the NVM 150. For example, the compaction operation may compress data in a long structured merge (LSM) tree-based data structure.

The compaction module 122 may read at least one key stream stored in the first area AR1 of the NVM 150 and identify an invalid key. Here, an "invalid key" may be a key corresponding to a value that has received (or been the subject of) a delete command CMD received from the host 200. The compaction module 122 may generate the new key stream using only valid key(s) included in at least one key stream. The compaction module 122 may write the generated new key stream in the first area AR1 of the NVM 150.

As the new key stream is generated, the compaction module 122 may change or delete values corresponding to at least one key stream including at least one invalid key in the key-matrix 140. In addition, the compaction module 122 may update the key-matrix 140 based on the newly generated key stream.

A GC module 123 may perform the garbage collection in relation to one or more blocks of the NVM 150. For example, the GC module 123 may identify a number of key streams including indices related with each block of the NVM 150 based on the key-matrix 140, select a block that has the least number of identified key streams ST_KEY as a target block, and perform the GC operation on the target block. One possible approach to this operation will be described in some additional detail with reference to FIGS. 8A through 8D.

Figure 3:
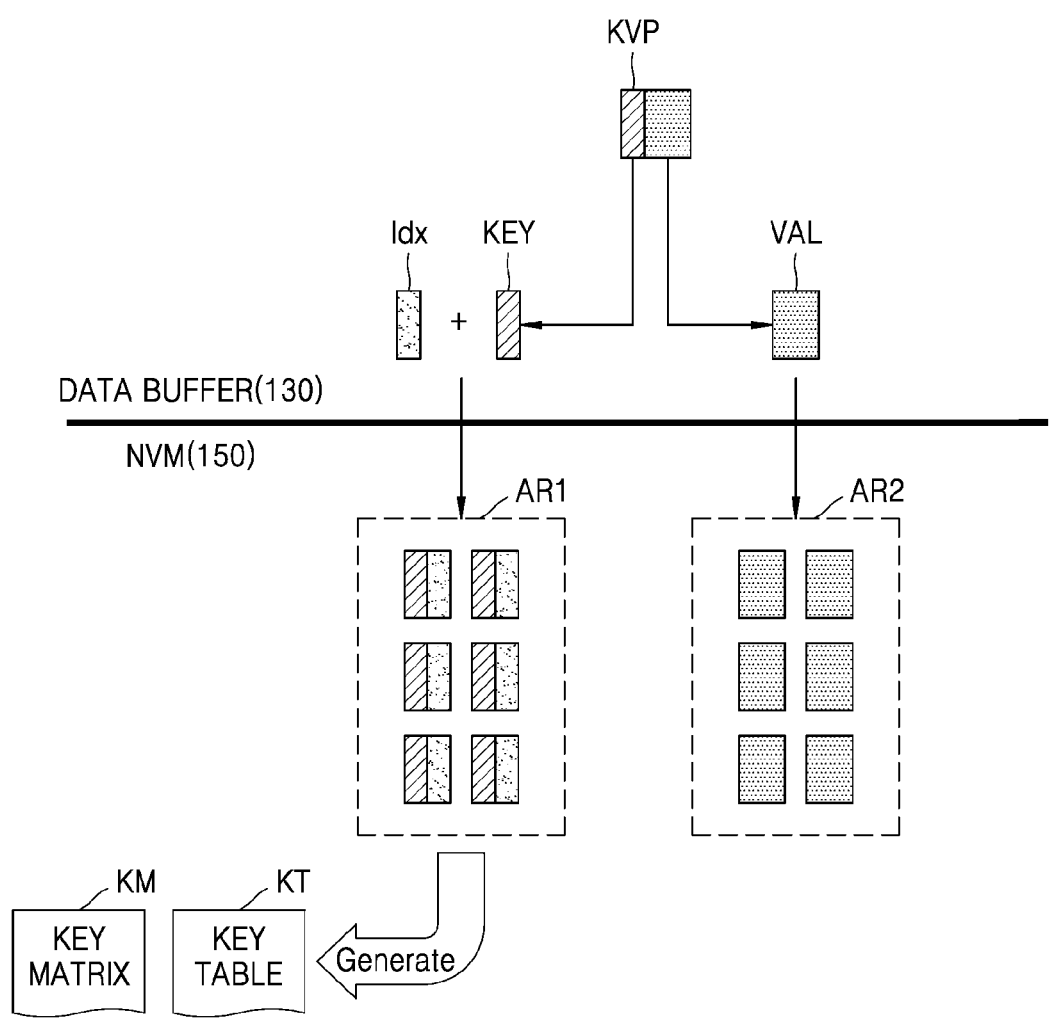
FIG. 3 is a conceptual diagram illustrating in one example the operation of the key-value storage device of FIGS. 1 and 2.

FIG. 3 is a conceptual diagram illustrating in one example the operation of a key value storage device according to embodiments of the inventive concept. That is, FIG. 3 is a conceptual diagram illustrating a storage operation for key-value pair(s) and a generation operation for a key matrix of a key-value storage device.

Referring to FIGS. 1, 2 and 3, the key-value manager 120 may receive key-value pairs (KVP), and separate keys (KEY) from values (VAL) included in the key-value pairs. The key-value manager 120 may then generate a value stream by merging a set of values, and store the generated value stream in the second area AR2 of the NVM 150.

The key-value manager 120 may combine an index (Idx), associated with a value, with a key, and store the combination of (index+key) in the data buffer 130. Here, the index may identify a physical address in the second area AR2 of the NVM 150 at which the value associated with the index is stored. However, the inventive concept is not limited thereto, and the index may include block information identifying a block in which the value is stored.

In addition, the key-value manager 120 may generate the key stream by merging a set of keys, wherein each key in the set of keys is combined with an index, and store the generated key stream in the first area AR1 of the NVM 150. The key-value manager 120 may generate a key table (KT) using the physical address(es) stored in the first area AR1 of the NVM 150 in which the key stream is stored. In other words, the key table may be used to store the physical addresses of the NVM 150 in which the key streams and the value streams are stored.

The key-value manager 120 may thereafter—by use of an index included in a key stream—identify which block of the NVM 150 stored the key stream, and may update a key matrix (KM) using the block identification result.

Figure 4A:
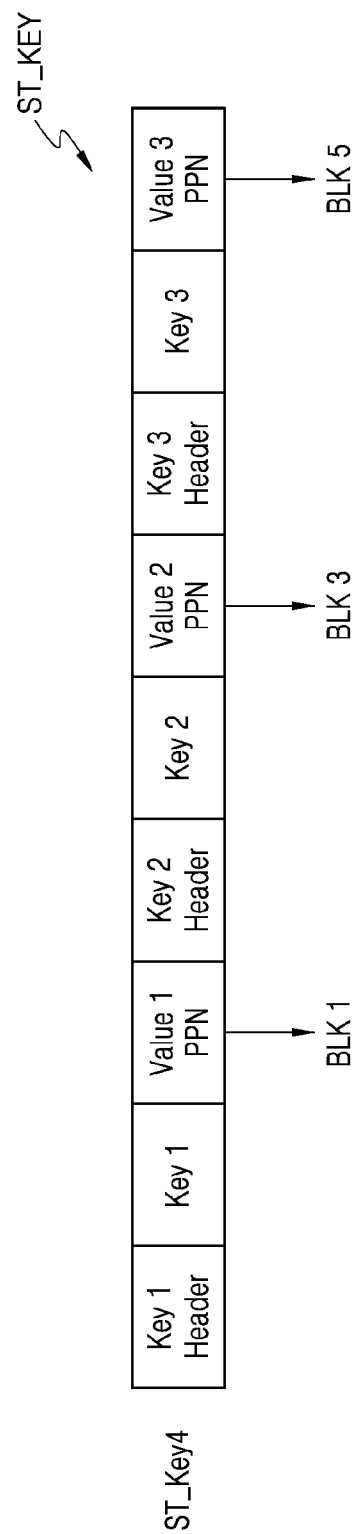
FIGS. 4A and 4B are conceptual diagrams further illustrating examples of the operation of the key-value manager of FIG. 3.
Figure 4B:
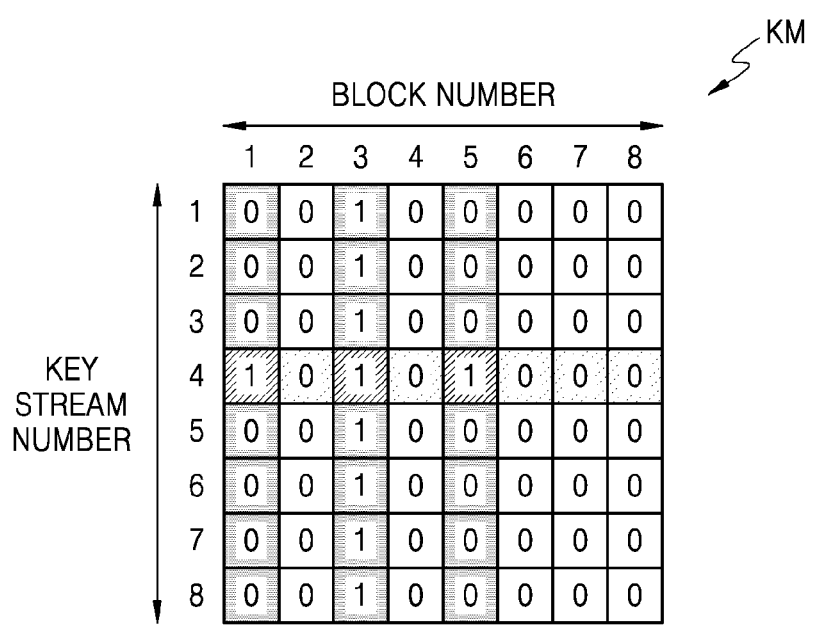

FIGS. 4A and 4B are conceptual diagrams illustrating in one example the operation of a key-value manager according to embodiments of the inventive concept. That is, FIGS. 4A and 4B are conceptual diagrams illustrating an operation in which a key-value manager updates a key matrix. The operating method for the key-value manager according to embodiments of the inventive concept may be performed by the key-value manager 120 of FIGS. 1, 2 and 3.

Referring to FIGS. 1, 2, 3, and 4A, the key-value manager 120 may generate a fourth key stream (ST_KEY4) by combining keys (e.g., Key1, Key2, and Key3) with physical addresses (e.g., Value1PPN, Value2PPN, and Value3PPN) as indices for values (e.g., Value1, Value2, and Value3) respectively corresponding to the keys.

The key-value manager 120 may identify at least one block in which the values (Value1, Value2, and Value3) corresponding to the keys (Key1, Key2, and Key3) are stored by referencing the physical addresses (Value1PPN, Value2PPN, and Value3PPN) included in the key stream ST_KEY. That is, as may be seen from FIG. 4A, the key-value manager 120 may identify that a first value (Value1) is stored in a first block BLK1 according to a first physical address (Value1PPN); a second value (Value2) is stored in a third block BLK3 according to a second physical address (Value2PPN); and a third value (Value3) is stored in a fifth block BLK5 according to a third physical address (Value3PPN).

Referring to FIG. 4B, the key-value manager 120 may also be used to update a key matrix (KM) using the identified block information. Here, the key matrix may be implemented as a two-dimensional matrix in which one axis is a block number corresponding to a number of blocks in the NVM 150, and the other axis is a key stream number corresponding to a number of key streams. In the illustrated example of FIG. 4B, the key matrix uses marker value (i.e., '0' or '1') to indicate whether or not a particular block is associated with a particular key stream. For example, a '0' marker value may be used to indicate that the particular key stream is not associated with a particular block, and a '1' marker value indicates the contrary.

In this regard, the key-value manager 120 may identify a row of a key stream number corresponding to a newly generated key stream among the key stream numbers of the key matrix, identify columns associated with block number(s) corresponding to a block identified among the block numbers of the key matrix, and change a value corresponding to the identified row and the identified column. For example, referring to FIGS. 2, 4A and 4B, the key-value manager 120 may identify a fourth row in the key matrix as corresponding to the generated fourth key stream ST_KEY4 of FIG. 4A, and identify the first column, the third column, and the fifth column that respectively correspond to the identified at least one block (BLK1, BLK3, or BLK5). In addition, the key-value manager 120 may change values corresponding to the identified rows and the identified columns using a form (e.g.,) identifying (row, column)—for example, ((4,1), (4,3), (4,5))—as well as values '0' and '1'.

In the illustrated example of FIG. 4A, three (3) keys and three (3) indices are combined into the fourth key stream ST_KEY4, but this is just a teaching example and the inventive concept is not limited thereto. More or fewer keys and/or indices may be implicated in various key stream formats.

Figure 5:
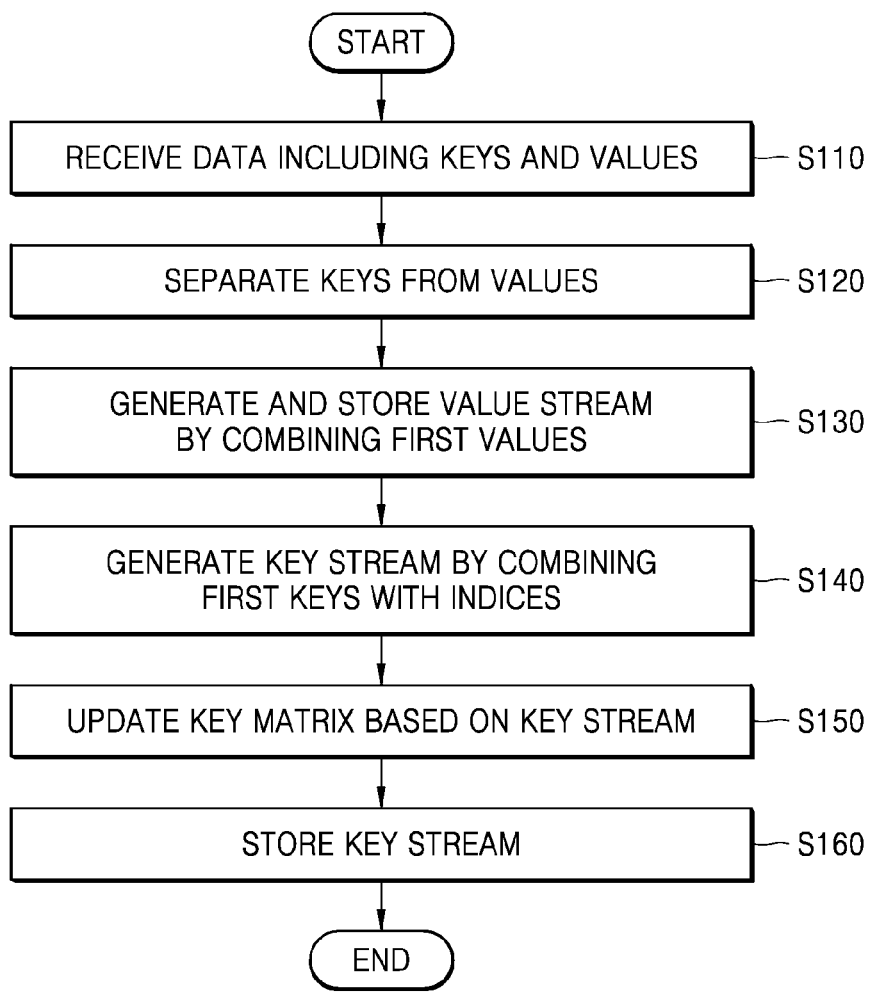
FIG. 5 is a flowchart summarizing an operating method for a key-value storage device according to embodiments of the inventive concept.

FIG. 5 is a flowchart summarizing in one example an operating method for a key-value storage device according to embodiments of the inventive concept. The method described in relation to FIG. 5 may be used in conjunction with a storage operation for key-value pairs and a generation operation for a key matrix in key-value storage device like the one described in FIGS. 1, 2 and 3.

Referring to FIGS. 1, 2, 3 and 5, the storage device 100 may receive data including keys and values from the host 200 (S110). For example, the storage device 100 may receive a command CMD including the keys and the values from the host 200. Next, the storage device 100 may separate the keys and the values from the received data (S120). For example, the storage device 100 may separate the keys from the values, and respectively store the separated keys and the separated values in the data buffer 130.

Next, the storage device 100 may generate and store a value stream (S130). This may be accomplished, for example, by combining (or merging) "first values" from among the separated values in order to generate the value stream. That is, when a set of values is accumulated in the data buffer 130, the storage device 100 may generate the value stream by sequentially arranging the first values. Here, the storage device 100 may store the generated value stream in a designated portion of the NVM 150.

Next, the storage device 100 may generate a key stream by merging "first keys" from among the separated keys with indices for values corresponding to the first keys (S140). For example, when a set of keys is accumulated in the data buffer 130, the storage device 100 may generate the key stream by combining (or merging) the keys with indices associated with values corresponding to the first keys. In this case, each index among the indices may be a physical address corresponding to an area in the NVM 150 at which the corresponding value is stored.

Next, the storage device 100 may update a key matrix based on the key stream (S150). Here, the key matrix may include matching information indicating whether an index is "related to" one or more of the blocks of the NVM 150 for the key stream. For example, the storage device 100 may identify which block among the blocks of the NVM 150 an index Idx included in the key stream is related to, and may update the key matrix by changing a value corresponding to the key stream and the block related with the key stream as tracked by the key matrix.

Next, the storage device 100 may store the key stream (S160). For example, the storage device 100 may store the generated key stream in a designated portion of the NVM 150.

Figure 6:
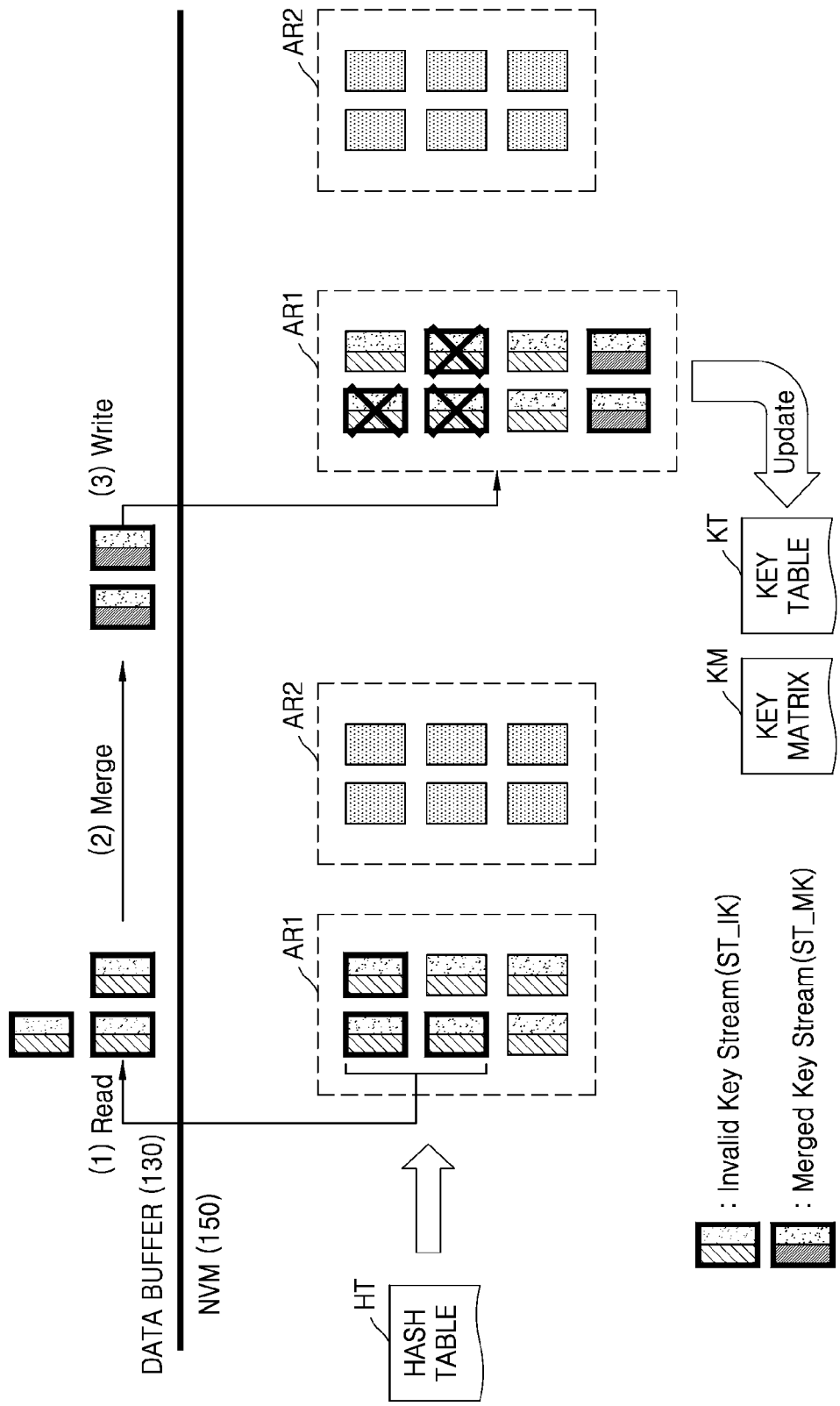

FIG. 6 is a conceptual diagram further illustrating in one example the operation of a key-value storage device according to embodiments of the inventive concept. In particular, FIG. 6 is a conceptual diagram further illustrating a compaction operation that may be performed by the key-value storage device 100 of FIGS. 1, 2 and 3.

Referring to FIGS. 1, 2, 3 and 6, the key-value manager 120 may (1) read two or more invalid key streams (ST_IK) from the first area AR1 of the NVM 150. And the key-value manager 120 may update validity information indicating whether or not a key included in the key stream is valid, as indicated by a hash table (HT) in response to various commands (CMD) received from the host 200. The key-value manager 120 may also determine whether or not the key stream is an invalid key stream based on the hash table HT. For example, when an erase command CMD directed to (or identifying) a first value is received from the host 200, the key-value manager 120 may identify a first key corresponding to the first value in the hash table HT based on a combined index, and update the hash table HT to indicate the invalidity of the first key.

Then, the key-value manager 120 may (2) generate a merged key stream (ST_MK) by merging the invalid key streams previously read. For example, the key-value manager 120 may generate the merged key stream by deleting one or more invalid keys, as described above, in order to generate valid key stream(s). Accordingly, the merged key stream of FIG. 6 includes only valid keys.

The key-value manager 120 may now (3) write the merged key stream in the first area AR1 of the NVM 150. In addition, the key-value manager 120 may update the physical address of the merged key stream in the key table KT, delete the invalid key stream(s), and update validity information corresponding to the invalid key stream(s) in the hash table.

The key-value manager 120 may update the key matrix with respect to the invalid key stream(s) and the merged key stream ST_MK. For example, the key-value manager 120 may delete values corresponding to the invalid key streams from the key matrix, or change the marker values for a number of block(s) related to an index included in the merged key stream.

Thereafter, the key-value manager 120 may perform GC in relation to invalid values by referencing the key matrix. As the GC is performed based on the key matrix KM, invalid values may be deleted from the second area AR2 of the NVM 150.

FIGS. 7A and 7B are conceptual diagrams illustrating in one example an operation of a key-value manager according to embodiments of the inventive concept. FIGS. 7A and 7B are conceptual diagrams illustrating a compaction operation that may be performed by the key-value manager.

Referring to FIGS. 1, 2, 3 and 7A, the key-value manager 120 may read a second key stream (ST_KEY2) and a third key stream (ST_KEY3) as respective invalid key streams (ST_IK) from among stored keys.

In addition, the key-value manager 120 may extract a valid key and an index merged with the valid key from each of the second key stream ST_KEY2 and the third key stream ST_KEY3. That is, the key-value manager 120 may extract, from the second key stream ST_KEY2, a first physical address (Value1PPN) associated with a first key (Key1) and a first value (Value1) that corresponds to the valid key, and a second physical address (Value2PPN) associated with a second key (Key2) and a second value (Value2). And the key-value manager 120 may extract a sixth physical address (Value6PPN) associated with a sixth key (Key6) and a sixth value (Value6) corresponding to a valid key from the third key stream ST_KEY3.

The key-value manager 120 may now generate a new key stream (ST_MK) by merging the extracted valid keys and an indices that were extracted from valid keys. That is, referring to FIG. 7A, the key-value manager 120 may generate a fifth key stream (ST_KEY5) by merging the first physical address the extracted first key with first value, the second physical address of the second key with the second value, and the sixth physical address of the sixth key with the sixth value.

In addition, the key-value manager 120 may update the key matrix with respect to the new key stream and the invalid key streams. For example, first, based on addresses included in the new key stream, the key-value manager 120 may identify at least one block in which values related to the keys of the new key stream are stored. Referring to FIG. 7A, the key-value manager 120 may identify each of the values corresponding to the keys included in the fifth key stream that are stored in a sixth block BLK6 or the second block BLK2 of the NVM 150.

Then, the key-value manager 120 may identify a row corresponding to the merged key stream and column(s) corresponding to the identified block(s) in the key matrix, and may change values corresponding to the identified row and the identified column in the key matrix.

Referring to FIG. 7B, the key-value manager 120 may identify the row corresponding to the fifth key stream as a fifth row, identify the columns corresponding to the identified blocks (BLK6 and BLK2) as the second column and a sixth column, respectively, and change the marker values corresponding to the identified row and the identified column from '0' to '1'.

In addition, the key-value manager 120 may identify the rows corresponding to the invalid key streams in the key matrix, and change values corresponding to the identified rows. Referring to FIG. 7B, the key-value manager 120 may identify the second row and the third row as rows corresponding to the second key stream and the third key stream that include portions of the invalid key stream in the key matrix, and may change all marker values of '1' on the identified second row and third row to '0'.

With regard to FIG. 7B, although a method of updating the key matrix with respect to an invalid key stream has been described as including the step of changing marker values corresponding to an invalid key stream in the key matrix to '0', the method may alternately be implemented as a method in which rows corresponding to the invalid key stream are merely erased from the key matrix.

FIGS. 8A, 8B, 8C and 8D (hereafter, inclusively FIGS. 8A to 8D) are related conceptual diagrams illustrating in one example an operation of a key-value storage device according to an embodiments of the inventive concept. That is, FIGS. 8A to 8D conceptually illustrate a garbage collection (GC) operation for the storage device 100 of FIGS. 1 through 3.

Figure 8A:
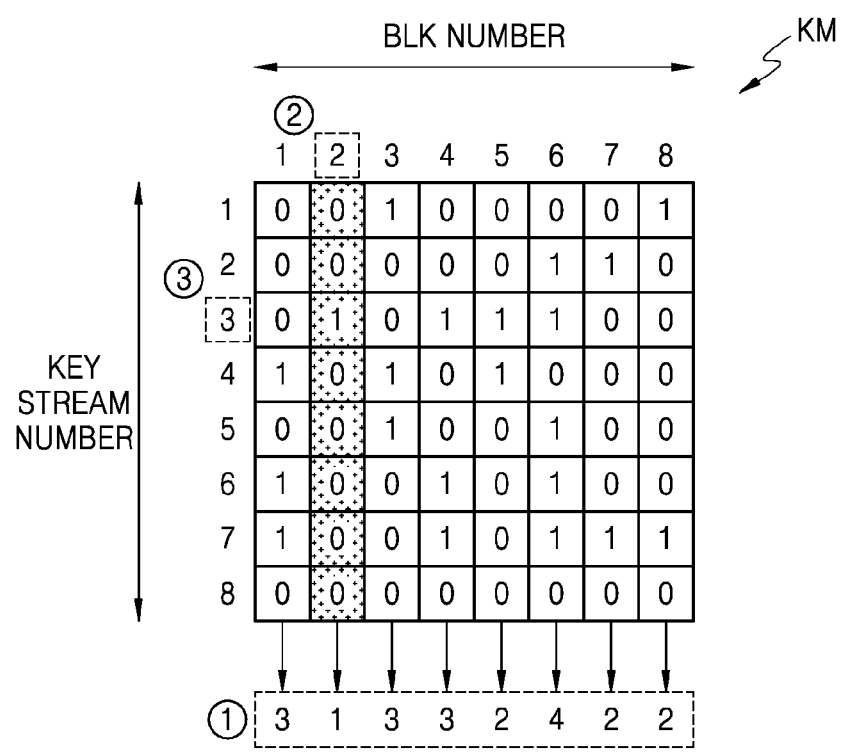
FIGS. 8A, 8B. 8C and 8D are related conceptual diagrams further illustrating the operation of a key-value storage device according to embodiments of the inventive concept.

Here, the key-value manager 120 may select a target block on which to perform GC with reference to a key matrix)KM. For example, the key-value manager 120 may identify a number of key streams including an index related to each block by using the key matrix, for each block of the NVM 150, and may select the target block from among the blocks using the identified result. Hereinafter, for convenience of description, it is assumed that, as illustrated in FIG. 8A, the key matrix has 64 values that correspond to eight (8) key streams (e.g., ST_KEY1 through ST_KEY8) and eight blocks (e.g., BLK1 through BLK8). However, the present disclosure is not limited thereto, and the key matrix may include values corresponding to any reasonable number of key streams and/or blocks. In addition, hereinafter, for convenience of description, it is assumed that an index corresponding to a value is a physical address identifying an area in which the value is stored.

For example, the key-value manager 120 may identify a number of marker values of '1' for each block number using the key matrix KM (①). Here, a marker value of '1' in the key matrix KM means that the key stream includes an address related to a corresponding block. Accordingly, the key-value manager 120 may identify a number of key streams including addresses related to each block by counting the number of '1' marker values in the row corresponding to each block.

For example, referring to FIG. 8A, the key-value manager 120 may identify that, in the column corresponding to the first block (BLK1), the marker values of the rows corresponding to the key stream numbers (4, 6, and 7) are '1'. In other words, the key-value manager 120 may identify that the address related to the first block BLK1 is separately included in the fourth key stream (ST_KEY4), the sixth key stream (ST_KEY6), and the seventh key stream (ST_KEY7). Accordingly, the key-value manager 120 may identify that the number of key streams including addresses related to the first block BLK1 is three (3). On the other hand, the storage device 100 according to an embodiment of the inventive concept may, by using the key matrix, include an individual counter (not illustrated) that counts the number of '1' marker values in a column corresponding to each block.

Next, the key-value manager 120 may select a block having the least number of key streams including an address related to the block, as the target block (②). For example, referring to FIG. 8A, the key-value manager 120 may select the second block (BLK2) as a target block since it has least number of '1' marker values. Next, the key-value manager 120 may identify at least one key stream including an address related to the target block from the key matrix (③). For example, referring to FIG. 8A, the key-value manager 120 may identify the row corresponding to the marker value of '1' is the third row in the second column corresponding to the second block BLK2 that is the target block. Next, the key-value manager 120 may identify that the key stream corresponding to the third row as the third key stream (ST_KEY3).

Figure 8B:
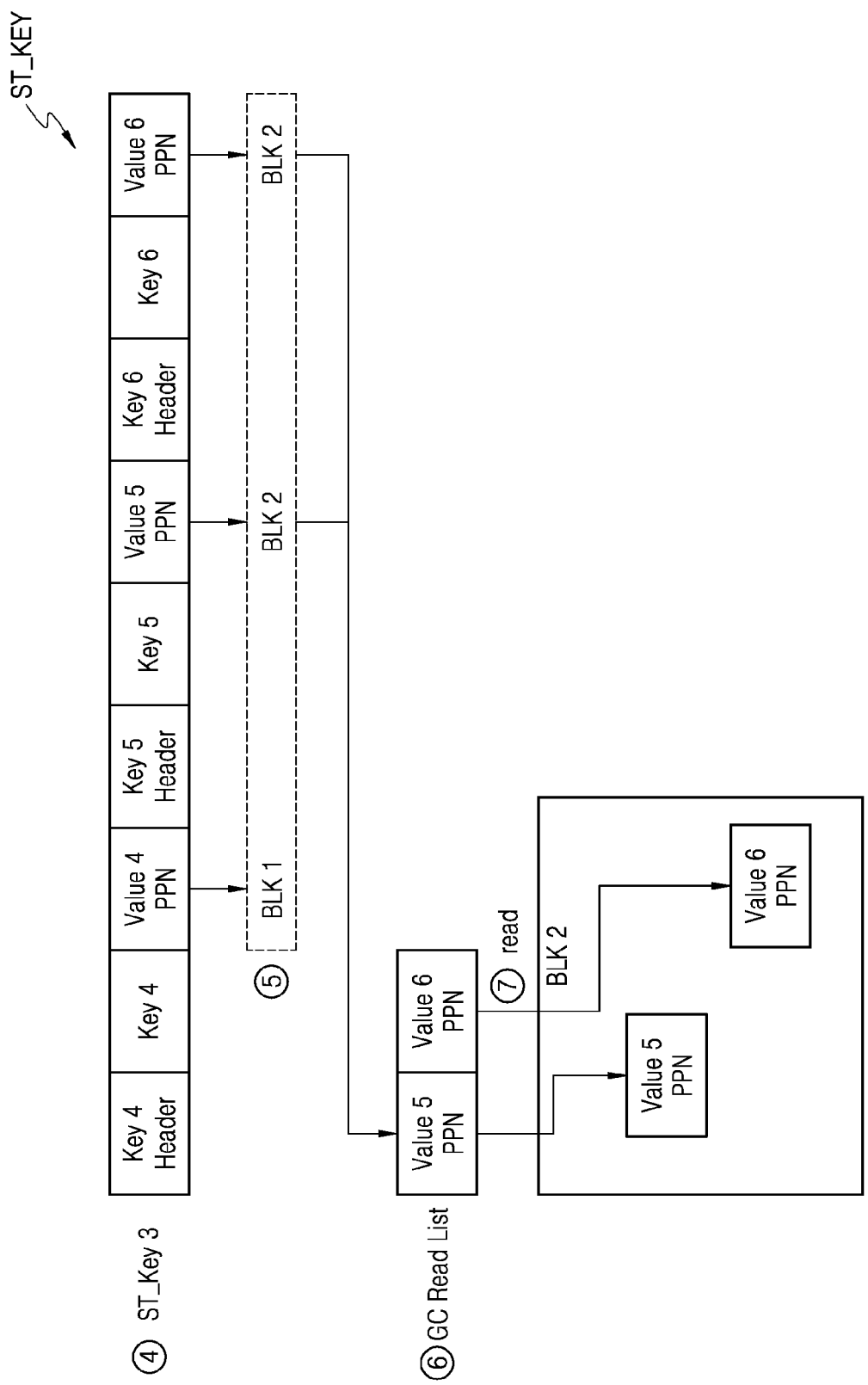

Next, referring to FIG. 8B, the key-value manager 120 may read the identified third key stream ST_KEY3 from the NVM 150 (④), and identify the addresses related with the target block (⑤). For example, the key-value manager 120 may read the third key stream and identify the fifth physical address Value5PPN of the fifth value Value5 and the sixth physical address Value6PPN of the sixth value Value6 as the addresses related with the second block from the read third key stream.

Next, the key-value manager 120 may generate a GC read list (GC Read List) from the identified addresses (⑥). Next, the key-value manager 120 may read the value from the target block using the GC read list (⑦). For example, the key-value manager 120 may generate the GC read list using the fifth physical address Value5PPN of the fifth value Value5 and the sixth physical address Value6PPN of the sixth value Value6, and may read the fifth value Value5 and the sixth value Value6 from the second block BLK 2 by using the GC read list.

Figure 8C:
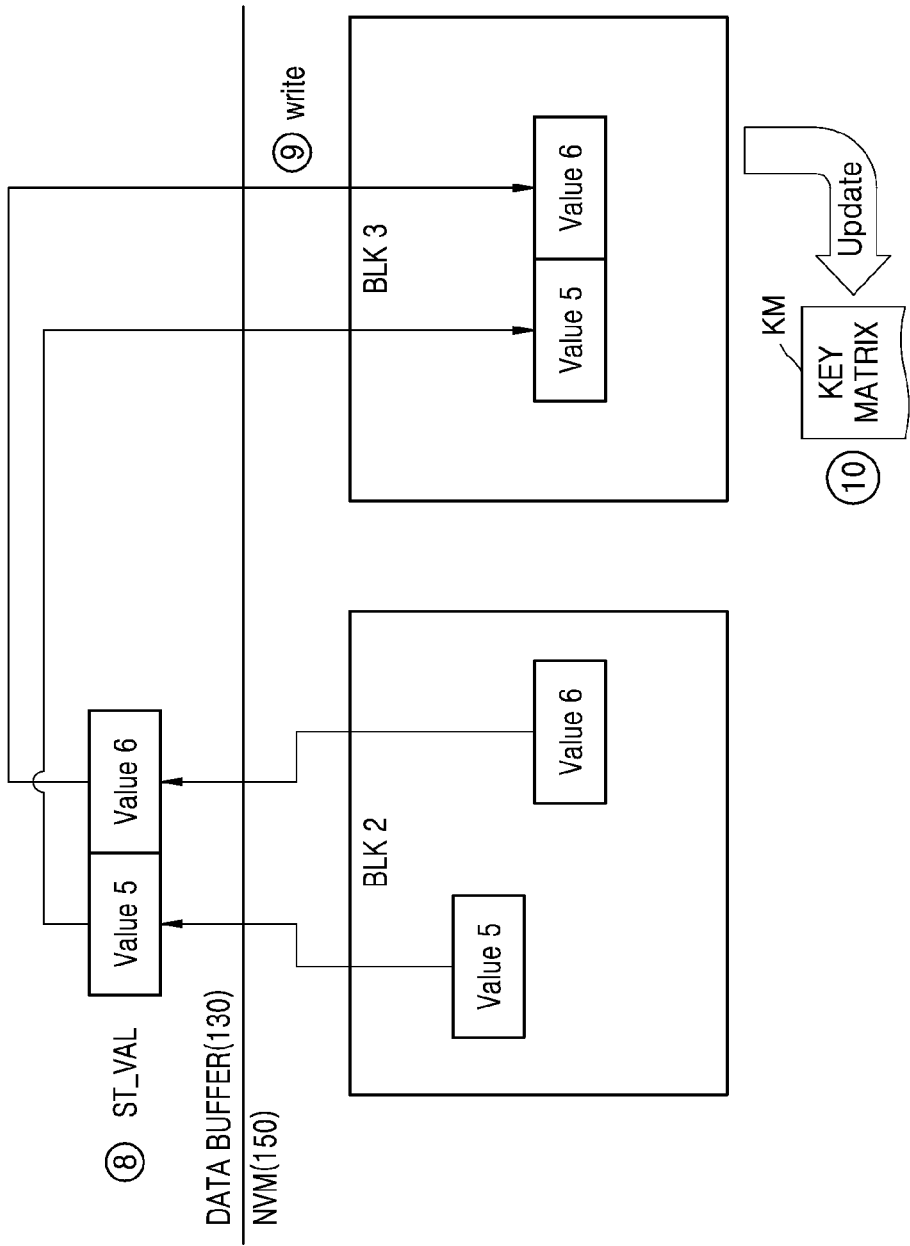

Next, referring to FIG. 8C, the key-value manager 120 may generate a new value stream using the read values (⑧), and store the generated new value stream in a new area (⑨). For example, the key-value manager 120 may generate a new value stream using the fifth value Value5 and sixth value Value6, and store the new value stream in the third block (BLK3).

Next, the key-value manager 120 may update the key stream and the key matrix (⑩). Here, the key-value manager 120 may update the key stream by changing the address of the read value to a new address in the key stream including the key corresponding to the value read from the target block. In addition, the key-value manager 120 may update the key matrix based on the updated key stream.

Figure 8D:
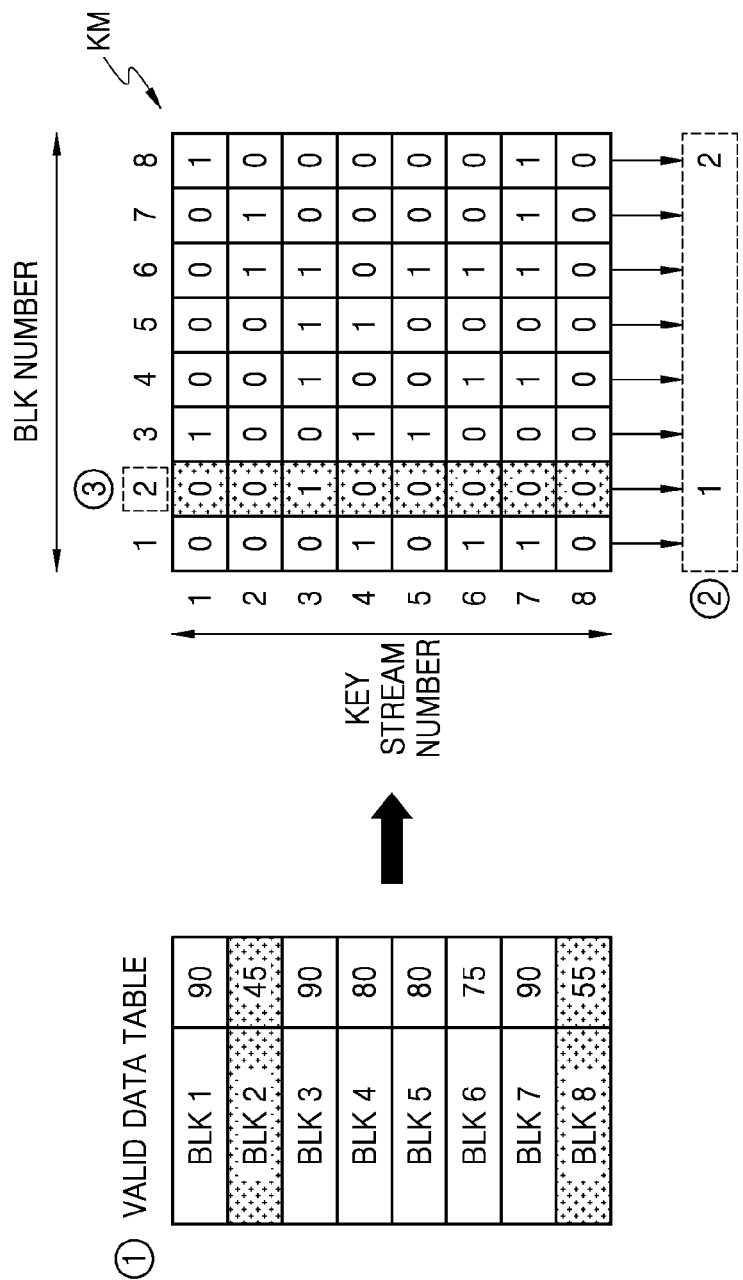

Referring to FIG. 8D and another embodiment, the key-value manager 120 may select the target block to perform the GC operation using a different method. First, the key-value manager 120 may select a candidate block for each block using a valid data table (Valid Data Table) including information indicating a ratio of valid data to all data in a block. The key-value manager 120 may then select a block having a ratio of valid data that is equal to or less than a reference ratio for the candidate block using the valid data table. For example, when the reference ratio is set to about 60, the key-value manager 120 may select the second block BLK2 (that is, a block having the block number '2') and the eighth block BLK8 (that is, a block having the block number '8'), of which the ratio of valid data to the all data are about 45 and about 55 (based on an assumed scale of 100), respectively, as the candidate blocks In addition, the key-value manager 120 may identify a number of '1' marker values for columns respectively corresponding to candidate blocks using the key matrix (②). For example, the key-value manager 120 may identify a number of '1' marker values in the second column corresponding to the second block BLK2 and in the eighth column corresponding to the eighth block BLK8, respectively.

In addition, the key-value manager 120 may select a block having the least number of '1's marker values among the candidate blocks as the target block (③). For example, referring to FIG. 8D, since the number of '1's in the second column corresponding to the second block BLK2 is less than that in the eighth column, the key-value manager 120 may select the second block BLK2 as the target block.

Alternately, with respect to the embodiment and FIG. 8D, it has been shown that the candidate block is selected using the valid data table, and the target block is selected from the candidate blocks using the key matrix. However, other methods in which the candidate block is selected using the key matrix, and the target block is selected using the valid data table may be implemented. As an example, the key-value manager 120 may select, using the key matrix, a block in which the number of key streams including related addresses is less than a predetermined number, as the candidate block, and may select a block having the least ratio of valid data among the candidate blocks as the target block.

Figure 9:
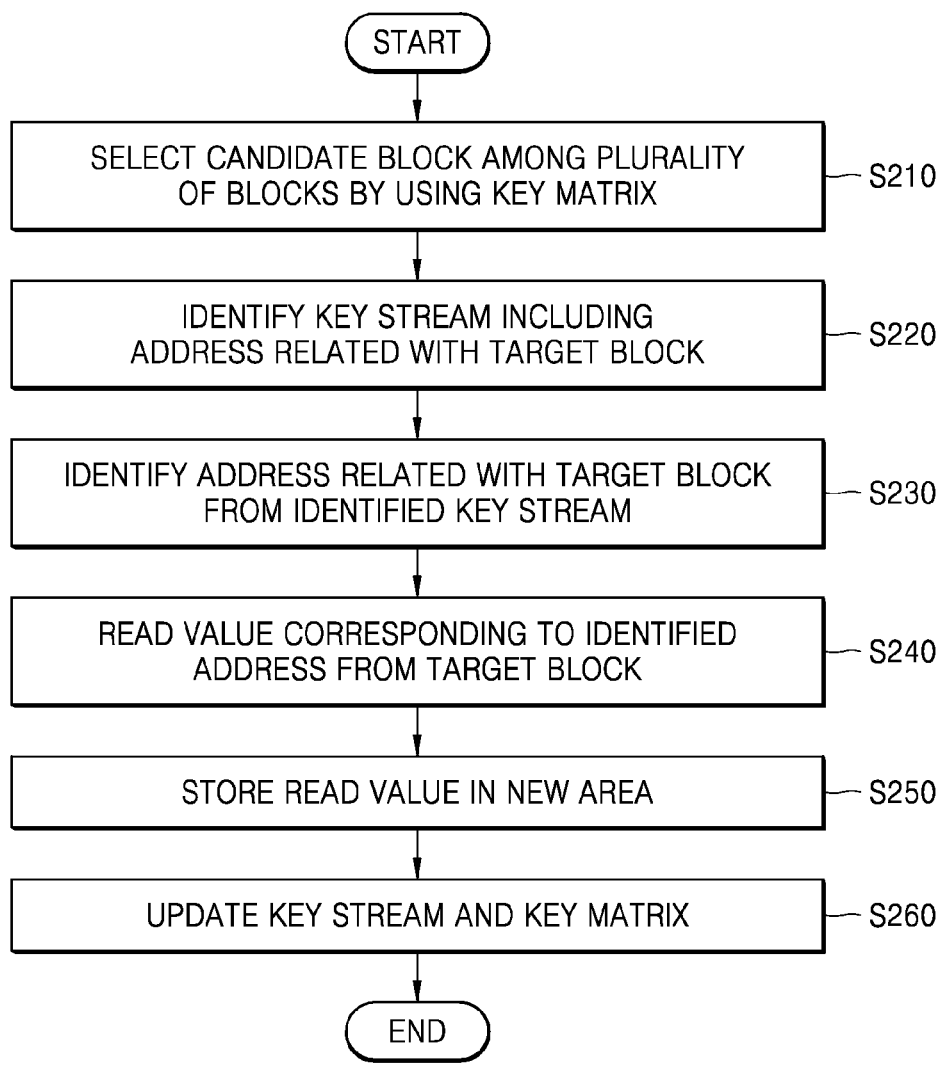
FIGS. 9 and 10 are flowcharts respectively summarizing various aspects of operating methods for key-value storage devices according to embodiments of the inventive concept.

FIG. 9 is a flowchart summarizing in one example an operating method for a key-value storage device according to embodiments of the inventive concept. That is, FIG. 9 is a conceptual diagram illustrating a GC operation that may be performed by the storage device 100 of FIGS. 1, 2 and 3.

Referring to FIGS. 2, 3 and 9, the storage device 100 may select the target block among the plurality of blocks of the NVM 150 using the key matrix (S210). For example, the storage device 100 may select a block having the least number of key streams including related addresses from among the blocks of the NVM 150 as a target block. For another example, the storage device 100 may select a candidate block by using information about a ratio of valid data, and select a block having the least number of key streams including related addresses among the candidate blocks as a target block. For another example, the storage device 100 may select a block having a certain number of key streams including related addresses that is equal to or less than a certain number as a candidate block, and may select a block having the least ratio of valid data among the candidate blocks as a target block.

Next, the storage device 100 may identify a key stream including an address associated with the target block (S220). The storage device 100 may identify a value indicating that an address related with the target block among values corresponding to the target block is included in the key matrix, and identify the key stream corresponding to the identified value.

Next, the storage device 100 may identify the address related with the target block from the identified key stream (S230). The storage device 100 may read the identified key stream from the NVM 150, and identify an address related with the target block among the addresses included in the read key stream.

Next, the storage device 100 may read the value corresponding to the identified address from the target block (S240). Next, the storage device 100 may store the read value in a new area (S250). When the read value is plural in nature, the storage device 100 may generate a new value stream (ST_VALUE) by merging the of values, and store the generated value stream in a new area. In this case, the new area may be a different area than the area in which the read value has previously been stored, and may be an area of a different block from the target block.

Next, the storage device 100 may update the key stream and the key matrix (S260). The storage device 100 may update the key stream by changing the address of the previously read value to the new address. In addition, the storage device 100 may update the key matrix based on the updated key stream.

According to certain embodiments of the inventive concept, the storage device 100 may reduce computational overhead and increase processing speed by determining the validity of values stored in a target block using a key stream.

Figure 10:
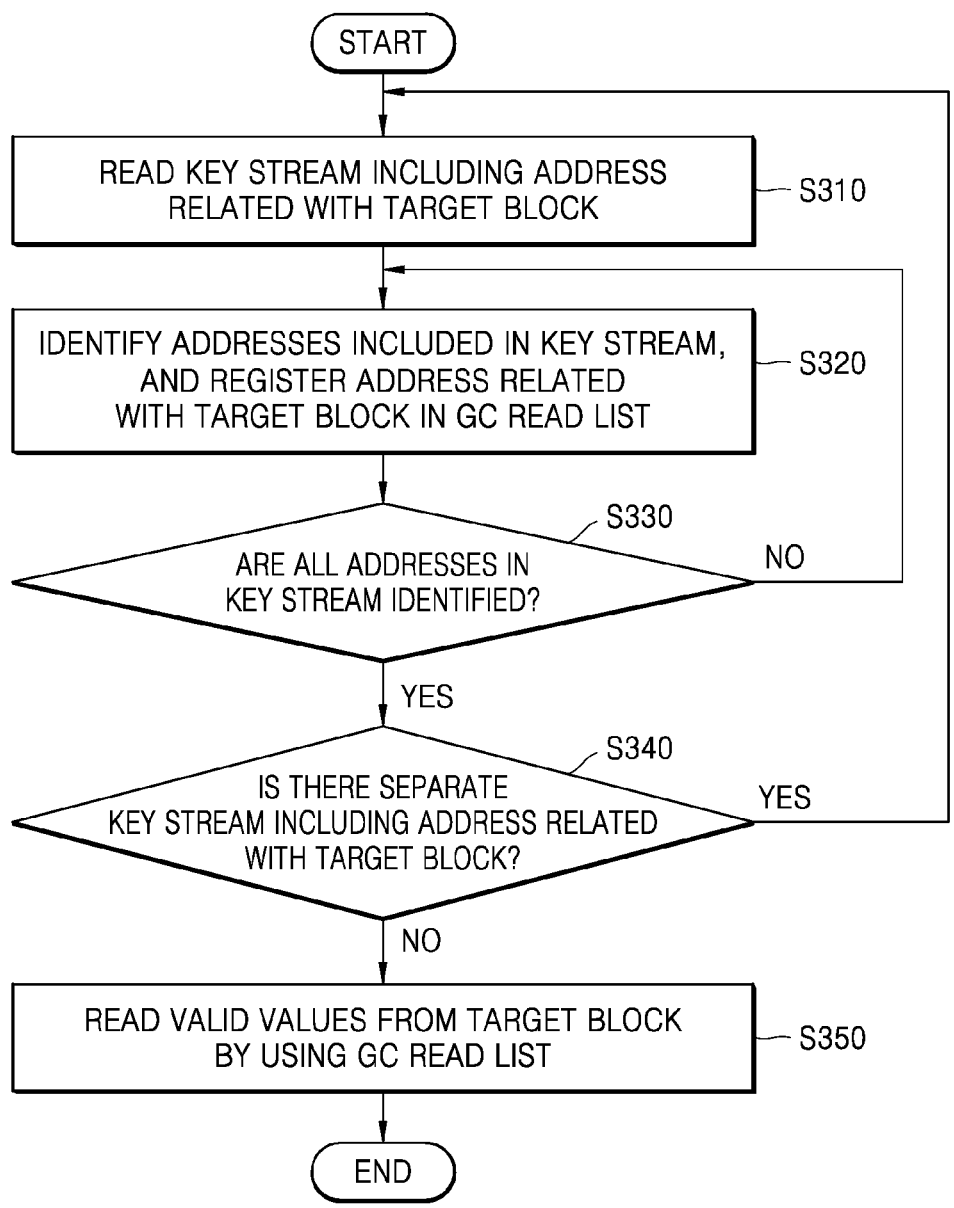

FIG. 10 is a flowchart further summarizing operations S220 through S240 in the operating method of FIG. 9 for a key-value storage device according to embodiments of the inventive concept.

Referring to FIGS. 9 and 10, the storage device 100 may read the key stream including the addresses related with the target block (S310). For example, the storage device 100 may identify the first key stream as the key stream including an address related with the target block by using the key matrix, and may read the first key stream from area(s) corresponding to the addresses of the first key stream.

Next, the storage device 100 may identify the addresses included in the read key stream, and register the address related with the target block in the GC read list (GC Read List) (S320). The storage device 100 may sequentially identify the addresses in the first key stream, and register at least one address related with the target block in the GC read list.

Next, the storage device 100 may determine whether all addresses included in the key stream have been identified with respect to the target block (S330). In the process of sequentially identifying the addresses in the first key stream, the storage device 100 may determine whether the relation with the target block has been identified up to the last address. When all addresses in the key stream have not been identified (S330=NO), the storage device 100 may repeat operation S320. In other words, the storage device 100 may identify the relation of the target block with a next order address in the first key stream.

On the other hand, when all the addresses in the key stream have been identified (S330=YES), the storage device 100 may identify whether there is a separate key stream including the addresses related with the target block (S340). The storage device 100 may identify whether there is the second key stream including the addresses related with the target block in addition to the first key stream by using the key matrix. When there is a separate key stream including the addresses related with the target block (S340=YES), the storage device 100 may repeat operation S320 for the corresponding key stream. On the other hand, when there is no separate key stream including the addresses related with the target block (S340=NO), the storage device 100 may read the valid values from the target block by using the GC read list (S350).

Figure 11:
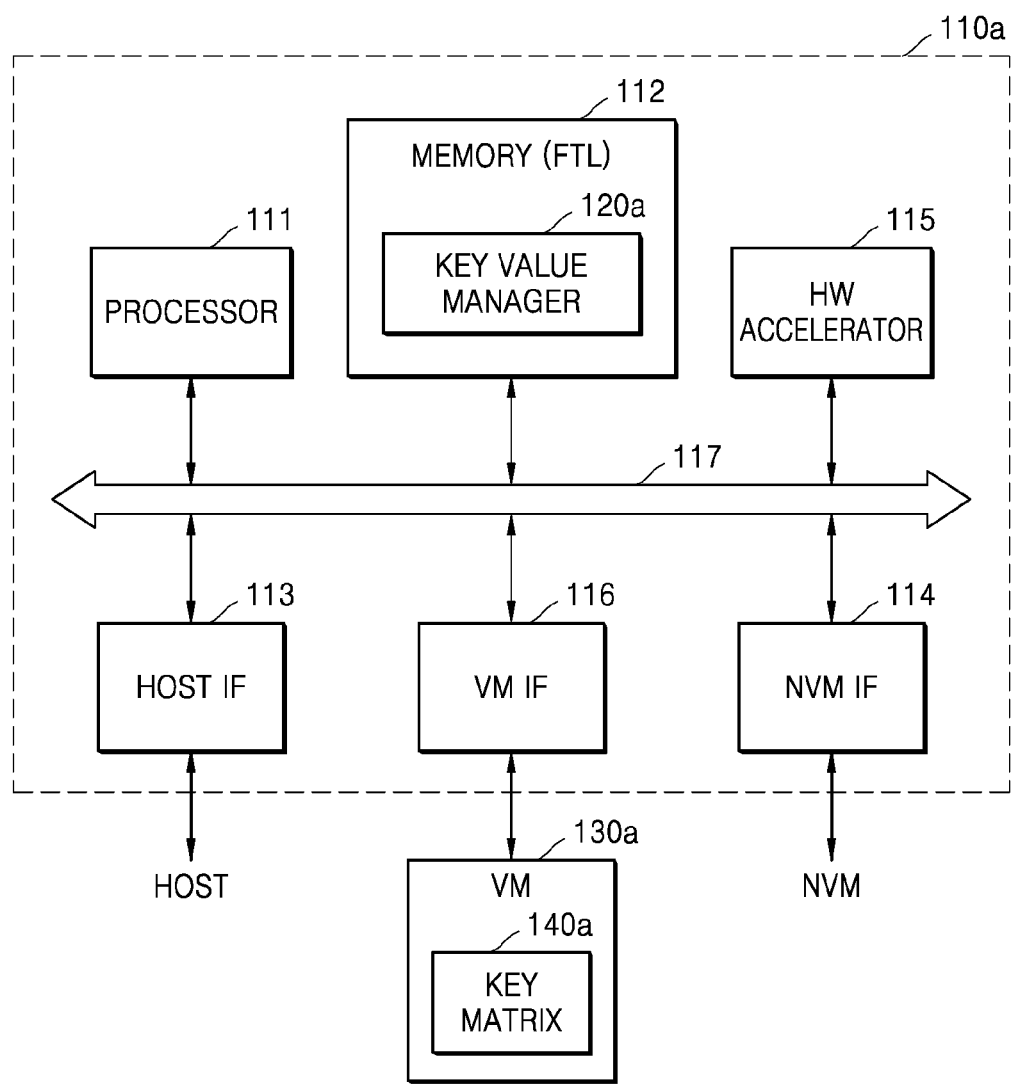
FIG. 11 is a block diagram illustrating a storage device according to embodiments of the inventive concept.

FIG. 11 is a block diagram illustrating a storage device 100a according to embodiments of the inventive concept.

Referring to FIG. 11, the storage device 100a may include a controller 110a, a volatile memory (VM) 130a, and the NVM. In addition, the controller 110a may include a processor 111, a memory 112, a host interface (IF) 113, a NVM IF 114, a hardware (HW) accelerator 115, and a VM IF 116, which are capable of communicating with each other via a bus 117.

The processor 111 may include a central processing unit (CPU), a microprocessor, or the like, and may control the overall operation of the controller 110a. The memory 112 may operate under a control of the processor 111, and may be used as an operation memory, a buffer memory, a cache memory, or the like. For example, the memory 112 may be implemented as a VM such as DRAM and SRAM, or a NVM such as PRAM and a flash memory.

The key-value manager 120a may be implemented in firmware or software, and may be loaded into the memory 112. For example, the key-value manager 120a may be implemented in a flash translation layer (FTL), and may be loaded in the memory 112. However, the inventive concept is not limited thereto, and the key-value manager 120a may be implemented in hardware. The operations described above with reference to FIGS. 1 through 10 may be performed by the processor 111 by using the key-value manager 120a.

The host interface 113 may provide an IF between the host 200 and the controller 110a according to, for example, universal serial bus (USB), multi-media card (MMC), peripheral component interconnect (PCI) express (PCI-E), advanced technology attachment (ATA), serial ATA (SATA), parallel ATA (PATA), small computer system interface (SCSI), serial attached SCSI (SAS), enhanced small disk interface (ESDI), and integrated drive electronics (IDE), etc. The NVM IF 114 may provide the IF between the controller 110a and the NVM 150. For example, the key stream ST_KEY or a value stream ST_VAL may be transmitted and/or received (hereafter, "communicated") between the controller 110a and the NVM 150 via the NVM IF 114.

The VM IF 116 may provide the IF between the controller 110a and the VM 130a. For example, the key, the value, the mapping table and the key matrix may be communicated between the controller 110a and the VM 130a.

The VM 130a may store the mapping table and a key-matrix 140a. For example, the VM 130a may further store the keys and the values in the data buffer 130 in FIG. 2. To this end, the VM 130a may be implemented as a DRAM. The mapping table may include any one of the hash table and the key table described above with reference to FIGS. 1 through 10.

The HW accelerator 115 may include various types of accelerators such as a field-programmable gate array (FPGA), a massively parallel processor array (MPPA), a graphics processing unit (GPU), an application-specific integrated circuit (ASIC), a neural processing unit (NPU), a tensor processing unit (TPU), and a multi-processor system-on-chip (MPSoC). The HW accelerator 115 may be used for at least a portion of the GC operation such as selecting the target block by using the key-matrix 140a. In FIG. 11, the controller 110a is illustrated as including the HW accelerator 115, but the present disclosure is not limited thereto, and the HW accelerator 115 may be omitted.

Figure 12:
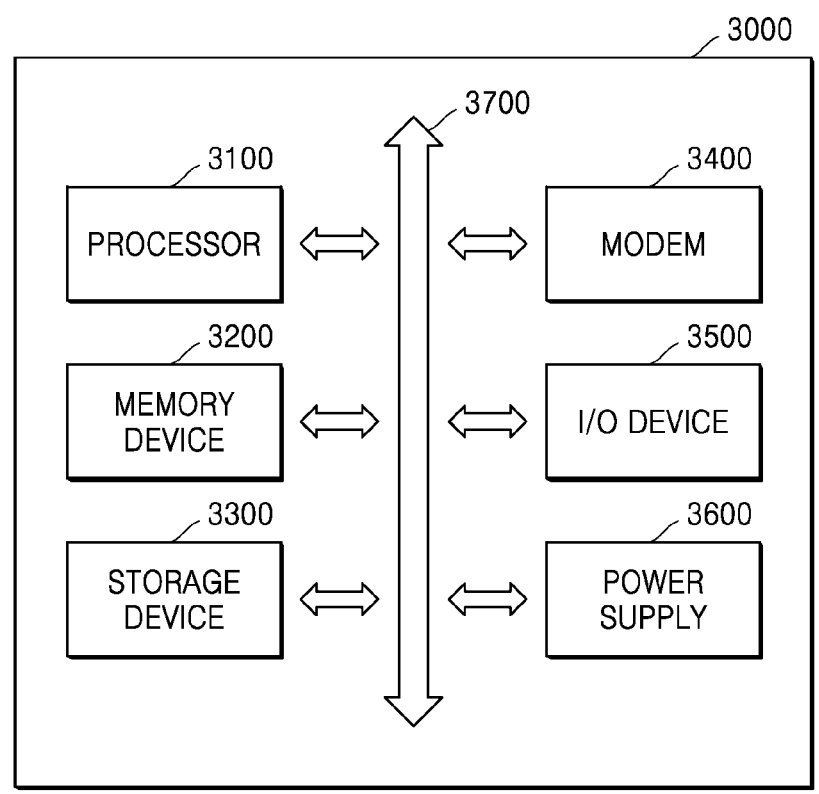
FIG. 12 is a block diagram illustrating an electronic device according to embodiments of the inventive concept.

FIG. 12 is a block diagram illustrating an electronic device 3000 according to embodiments of the inventive concept.

Referring to FIG. 12, the electronic device 3000 may include a processor 3100, a memory device 3200, a storage device 3300, a modem 3400, an input/output (I/O) device 3500, and a power supply 3600. For example, the storage device 3300 may be implemented by using the embodiments described above with reference to FIGS. 1 through 11.

For example, the storage device 3300 may receive key-value pairs including keys and values respectively corresponding to the keys from a host, and may separate the keys KEY and the values from the key-value pairs.

For example, the storage device 3300 may generate a value stream by merging the values, and store the generated value stream in a nonvolatile memory device. In addition, the storage device 3300 may combine an index corresponding to the value with each of the keys, generate the key stream by adding the keys of which each is combined with the index, and store the generated key stream in the nonvolatile memory device.

For example, the storage device 3300 may update, based on the generated key stream, the key matrix indicating whether the index related with each of the blocks of the nonvolatile memory device for each key stream is included. In addition, the storage device 3300 may select the target block to perform a garbage collection operation using the key matrix, read the key stream related with the target block using the key matrix, identify a storage location of the valid value related with the target block from the read key stream, and read the valid value and store the valid value in a new area. Accordingly, after reading all the values included in the target block, the storage device 3300 may determine the validity of values stored on the target block using the key stream without determining the validity of each of the read values, and may reduce the computational overhead associated with the garbage collection operation and increase overall processing speed.

For example, the storage device 3300 may perform the above-described operations by itself, without receiving the command CMD from the processor 3100.

While the inventive concept has been particularly shown and described with reference to embodiments thereof, it will be understood that various changes in form and details may be made therein without departing from the spirit and scope of the following claims.

What is claimed is:
1. A storage device comprising:
a non-volatile memory (NVM) divided into blocks; and
a controller configured to
receive a command and key-pairs including keys and values respectively corresponding to the keys,
separate the keys from the values,
generate value streams by combining sets of the values,
generate key streams by merging sets of the keys with indices for values from among the sets of the values respectively corresponding to the keys in the sets of the keys, update a key matrix that indicates whether an index among the indices of the key streams is related to each one of the blocks of the NVM, identify for each of the blocks of the NVM a number of key streams from among the key streams including indices respectively related with the blocks based on the key matrix, select a target block from among the blocks that has a smallest number of key streams, and perform a garbage collection operation on the target block.

2. The storage device of claim 1, wherein the indices comprise physical addresses at which the values from among the sets of the values are stored in the NVM.

3. The storage device of claim 2, wherein the controller is configured to, based on the indices in a key stream from among the key streams, identify at least one block from among the blocks storing values corresponding to the key stream, and change a marker value corresponding to the key stream and the identified at least one block in the key matrix.

4. The storage device of claim 3, wherein the controller is configured to generate a third key stream by merging a pre-stored second key stream with the key stream, delete information corresponding to the key stream and the pre-stored second key stream in the key matrix, and update the key matrix based on at least one index in the third key stream.

5. A storage device comprising:
a non-volatile memory (NVM) divided into blocks, and configured to store key streams including keys, and to store value streams including values respectively corresponding to the keys;

a data buffer configured to store a key matrix that includes for each key stream among the key streams information indicating whether values respectively corresponding to keys included in the key streams are stored in each one of the blocks; and a controller configured to select a target block from among the blocks based on the key matrix and perform a garbage collection on the target block, wherein the controller is configured to use the key matrix to identify a number of the key streams including keys corresponding to values stored in each one of the blocks, and select the target block as a block from among the blocks having a least number of the key streams identified using the key matrix.

6. The storage device of claim 5, wherein the controller is configured to, using the key matrix, identify at least one key stream from among the key streams including a key corresponding to a value stored in the target block, and read the at least one key stream from the NVM.

7. The storage device of claim 6, wherein the key streams include addresses of the values corresponding to the keys, and the controller is further configured to identify an address related to the target block from the at least one key stream, and read a value corresponding to the address from the target block using the address.

8. The storage device of claim 7, wherein the controller stores the read value in a different area from an area in which the read value had been previously stored in the nonvolatile memory.

9. The storage device of claim 8, wherein the controller is configured to, in a key stream from among the key streams comprising a key corresponding to the read value, change an address of the read value to a new address of the read value.

10. An operating method for a storage device including a non-volatile memory (NVM) divided into blocks, the operating method comprising:

generating and storing key streams including keys and addresses for values respectively corresponding to the keys;

for each key stream of the key streams, updating a key matrix indicating whether an address from among the addresses related to each of the blocks is included;

based on the key matrix, selecting a target block from among the blocks; and performing a garbage collection operation on the target block, wherein the performing of the garbage collection operation comprises using the key matrix to identify at least one key stream from among the key streams including an address related with the target block, using the at least one key stream to identify at least one address related with the target block, using the at least one address to read at least one value from the target block, storing the at least one value in a new area in the NVM, and in a key stream comprising a key corresponding to the at least one value, changing an address of the at least one value to a new address to provide a changed key stream.

11. The operating method of claim 10, wherein the selecting of the target block using the key matrix comprises:
selecting a block from among the blocks having a least number of the key streams including addresses related to the blocks.

12. The operating method of claim 10, wherein the selecting of the target block comprises:
based on ratio information for valid data of each of the blocks, selecting candidate blocks from among the blocks; and using the key matrix, selecting a block from among the key streams having a least number of the key streams comprising addresses related to the candidate blocks as the target block.

13. The operating method of claim 10, wherein the performing of the garbage collection operation further comprises:
updating the key matrix based on the changed key stream.

* * * * *